Dec. 11, 1928.
H. D. LEVINE
1,694,711
METHOD FOR THE MANUFACTURE OF JAVELLE WATER
Filed May 7, 1925
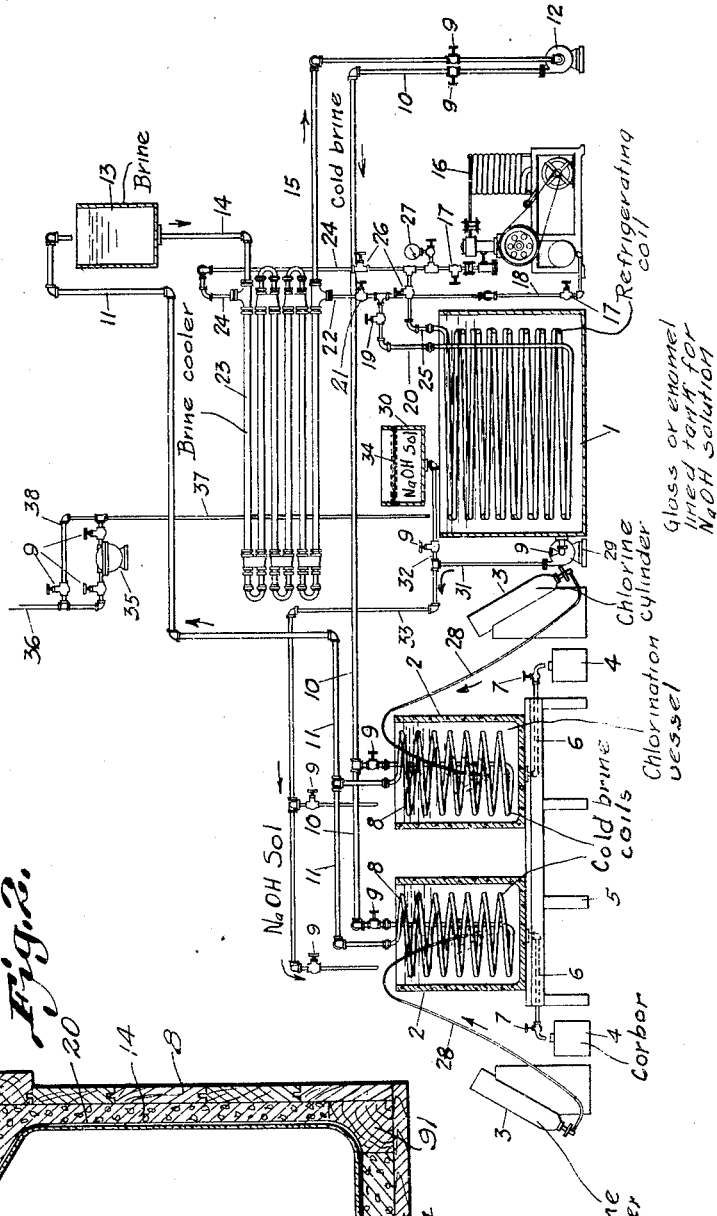

Patented Dec. 11, 1928.

1,694,711

UNITED STATES PATENT OFFICE.

HARRY D. LEVINE, OF PHILADELPHIA, PENNSYLVANIA.

METHOD FOR THE MANUFACTURE OF JAVELLE WATER.

Application filed May 7, 1925. Serial No. 28,661.

The object of the invention is the provision of a novel method of manufacture of Javelle water, wherein the period of time necessary for manufacture is radically reduced and a more efficient product is obtained.

A further object of the invention is the provision of a novel method for the filtration of water and the filtration of one of the ingredients, namely, caustic soda solution, thus eliminating the impurities and foreign matter, thereby resulting in an absolutely pure product.

A still further object is the provision in a method and apparatus of this character of means for preserving the product.

With these and such other objects in view as will be apparent from the description, my invention resides in the novel construction, combination and arrangement of parts hereinafter described, and claimed and illustrated in the accompanying drawings of which:—

Figure 1 is a schematic representation of the apparatus employed in the manufacture of the product;

Figure 2 is a vertical section through a carboy container for the finished product.

The details of the apparatus employed in the manufacture of the product consist of a tank 1, formed of a vitreous material such as glass, or concrete or porcelain lined, supplied with water through a feed pipe, 37, which is connected by way of a water filter 35, with a source of water supply, 36. The filter, 35, may be cut out and by manipulation of the valves, 9, the by-pass, 38, may be employed. Located adjacent the tank, 1, is an ammonia compressor, 16, from which the liquid ammonia is passed by way of the control valve, 17, pipe, 18, automatic expansion valve, 19, and pipe, 20, through a refrigerating coil disposed in the tank, 1, from which the ammonia is returned to the compressor through the pipe, 25, by way of control valve, 26, and, 17. The ammonia compressor, 16, in its relation to the tank, 1, forms a refrigerating unit for a solution held within the tank.

Mounted on a supporting base, 5, are a plurality of tanks, 2, having drain pipes, 6, extending from the bottom thereof for discharge of the tank contents into the carboy containers, 4, through the control valves, 7. Each of the tanks, 2, has disposed therein a cooling coil, 8, the coil members being formed of glass or some suitable vitreous material, and in connection at their inlets and outlets with the pipes, 10, and, 11, of a brine circulating system, wherein the circulation of the brine is maintained through a brine pump, 12, the brine passing from pump, 12, through delivery pipe, 10, through the coils, 8, in the tanks, 2, through the return pipe, 11, to the brine expansion pipe, 13, from which it is passed through the pipe, 14, to the brine cooler, 23, and returns through the pipe, 15, to the pump, 12.

The brine circulating system just described is provided for the purpose of refrigerating the liquid content of the tanks, 2, and is independent in its operation from the ammonia refrigeration system employed in connection with the tank, 1. The brine cooler, 23, is also employed as a cooler for the ammonia refrigerating unit, through the hand expansion valve, 21, ammonia pipe line, 22, cooler, 23, ammonia take-off pipe, 24, through which it is returned to the compressor, 16.

Over the tank, 1, is disposed a container, 30, for holding and filtering, through the filter, 34, a caustic soda solution. The pump 29, is employed to establish a circulation of the caustic soda solution from tank, 1, through the pipe, 31, control valve, 9, container, 30, filter, 34, and back to tank, 1, which circulation in contact with the ammonia refrigerating coils acts to rapidly reduce the temperature of the solution in the tank.

Disposed at suitable points adjacent the tanks, 2, are cylinders, 3, of chlorine gas connected for discharge through delivery tubes, 28, into the liquid contained in the tanks, 2. The circulating pipe, 31, from the tank, 1, is connected through the delivery pipe, 33, for delivery of the liquid contents of the tank, 1, into the tanks, 2, when desired.

It is to be expressly understood that the specific detail embodiments of the elements as shown, are not to be considered as the only means which may be employed. The ammonia coil in the tank 1, as well as the brine coils, 8, in the tanks, 2, may be in the form of a U or may take any desired configuration so long as the ends sought, are attained. It is an important feature of the invention that the tanks, 1, and, 2, as well as the cooling coils and all conduit connections through which the contents of tank, 1, pass into and from the tanks, 2, to the carboy containers, are formed of a non-metallic material, preferably porcelain lined or glass.

In following out the method for producing Javelle water, the tank, 1, is first filled with a caustic soda solution, which as is well known reaches the temperature of 180 degrees Fahrenheit in solution. The pump, 29, is operated to set up and maintain a continuous circulation of the caustic soda solution over the ammonia cooling coils in the tank, 1, the ammonia compressor being operated to provide the necessary circulation of the ammonia. As a result of this circulation and continuous refrigeration of the caustic soda in the tank, 1, the solution is properly blended and brought to a temperature of 32 degrees Fahrenheit within six hours. Methods heretofore employed in this art, have not been able to cool a caustic soda solution much below 75 degrees Fahrenheit and only then over a period of from 48 to 72 hours.

When the caustic soda solution in the tank, 1, has reached the desired temperature, the valve, 9, in the pipe line, 32, is closed and the contents of tank, 1, are discharged through the delivery pipe, 33, into the tanks, 2. The brine circulation system is set in operation to maintain the solution in the tanks, 2, at a constant temperature, which has been imparted thereto in the tank, 1. Chlorine gas from the cylinders, 3, is then discharged through the delivery tubes, 28, into the caustic soda solution held in the tanks, 2, until all of the chlorine gas has passed into solution forming sodium hypochlorite. The control valves, 7, are then opened to allow the tanks, 2, to drain into the carboys, 4. The finished product, namely, Javelle water contains 16% available chlorine, and by this method of manufacture and apparatus is made within five hours; whereas under normal atmospheric conditions and without the aid of refrigeration, the time necessary in manufacture covers a period of from 36 to 72 hours depending upon atmospheric conditions. By my method, the reaction material and the product, undergo refrigeration and filtration, and are not permitted to come in contact with any metal which would cause decomposition. Accordingly the product being free of decomposing agents, will be highly efficient and will give effective results, retaining its 16% available chlorine for six or eight months if properly packed and stored.

Figure 2 illustrates my improved carboy container for preserving the finished product delivered from the tanks, 2. The containers comprise the usual glass bottle, 11, wrapped in a layer of insulating paper, 20, and embedded in a packing, 14, of ground cork and anti-aqua cement. The bottle is supported at its bottom on wooden rests, 91, disposed within the packing case, 100, which is constructed of suitable high grade lumber, being closed at the top by the cover piece, 51, retained thereon by fastening screws, 61, embedded in the retaining blocks, 71. The packing, 14, is retained in position by means of a thick layer of cork, 3, at the top of the container beneath the cover piece. The carboys are sealed in the usual manner after filling.

While in this preferred embodiment of the apparatus and the method of manufacturing the product, I have illustrated and described certain details entering into the construction and operation of the invention, I desire it to be understood that the invention is not to be limited thereby, but that any desired changes and modifications may be made in the details as will fall within the scope of the invention as claimed.

I claim:—

1. A process of manufacturing Javelle water, comprising rapidly refrigerating a solution of caustic soda in water, during agitation, drawing off the solution when a low temperature of approximately 32 degrees Fahrenheit is obtained, charging the drawn off solution with chlorine gas during a period in which the solution is maintained at its low temperature, and storing the charged solution to form the finished product.

2. The process of forming Javelle water consisting of rapidly refrigerating a caustic soda solution to bring the same to a temperature substantially that of the freezing point of water, and maintaining the refrigerated solution at substantially said temperature constantly while discharging chlorine gas thereinto.

In testimony whereof I have affixed my signature.

HARRY D. LEVINE.